United States Patent [19]

Malvern

[11] Patent Number: 5,009,505

[45] Date of Patent: Apr. 23, 1991

[54] OPTICAL SENSOR FOR DETERMINING CHANGES IN A DIMENSION AND/OR A TEMPERATURE OF AN OBJECT

[75] Inventor: Alan R. Malvern, Bracknell, United Kingdom

[73] Assignee: British Aerospace Public Limited Company, London, England

[21] Appl. No.: 372,626

[22] Filed: Jun. 28, 1989

[30] Foreign Application Priority Data

Jun. 30, 1988 [GB] United Kingdom ............... 8815558

[51] Int. Cl.$^5$ ........................................ G01B 9/02
[52] U.S. Cl. ................................ 356/352; 356/345; 250/227.19
[58] Field of Search ................ 356/345, 351, 352; 250/227.19

[56] References Cited

U.S. PATENT DOCUMENTS 4,758,087  7/1988  Hicks ................................. 356/352

FOREIGN PATENT DOCUMENTS 0104932  4/1984  European Pat. Off. .
0144509  6/1985  European Pat. Off. .
2150687  7/1985  United Kingdom .
2178846  2/1987  United Kingdom .
2196112  4/1988  United Kingdom .

Primary Examiner—Samuel Turner
Attorney, Agent, or Firm—Cushman, Darby & Cushman

[57] ABSTRACT

A sensor comprises a resonator loop formed of polarization-maintaining, high birefringent optical fibre. Changes in the optical path lengths of each of the "fast" and "slow" optical paths in the loop are measured and processed to determine the strain and temperature change experienced by said fibre loop.

13 Claims, 5 Drawing Sheets

OPTICAL SENSOR FOR DETERMINING CHANGES IN A DIMENSION AND/OR A TEMPERATURE OF AN OBJECT

This invention relates to a sensor for determining changes in a dimension and/or a temperature of an object, a method for determining such changes, and structures incorporating such sensors.

Some space-based applications structures will be fabricated from composite materials and it has been proposed to provide such structures with integrated actuators and sensors for determining strain and temperature to give so-called "smart structures" in which the length of the structure can be kept constant. This set-up can be used for damping of vibration or for the elimination of long term length changes due to the effects of solar radiation. In such applications it is necessary to resolve strains down to very low levels with a high degree of accuracy over a wide frequency range. Some of these features are also required for other sensors for land, sea, or air based equipment.

It is known to measure changes in length, i.e. strain, of an object using a fibre optic interferometer but such readings are often dependent on the temperature of the optical fibre and a need exists therefore for an optical sensor which can discriminate between the effects of temperature and the effects of strain.

According to one aspect of this invention, there is provided a sensor for determining changes in either or both of a physical dimension and the temperature of an object, said sensor comprising:

means defining a first optical path through a medium having a first refractive index;

means defining a second optical path through a medium having a second refractive index different from said first refractive index, said second path being adjacent or substantially coincident with said first path;

means for introducing light into each of said paths, processing means responsive to changes in the optical path lengths of said first optical path and said second optical path caused by change in said physical dimension or temperature to output data representative of changes in at least one of the physical dimension and temperature.

According to another aspect of this invention, there is provided a method of determining changes in either or both of a physical dimension and the temperature of an object, said method comprising the steps of:

passing light along a first optical path through a medium having a first refractive index;

passing light along a second optical path through a medium having a second refractive index different from said first refractive index, said first and second paths being adjacent or substantially coincident;

obtaining data representative of changes in optical path lengths of each of said first and second optical paths caused by changes in said physical dimension or temperature; and processing said data to obtain data representative of changes in either or both of the physical dimension and temperature.

The invention also extends to structures incorporating sensors of the type defined above.

The invention will now be described by way of non-limiting example, reference being made to the accompanying drawings, in which.

Figure 4:
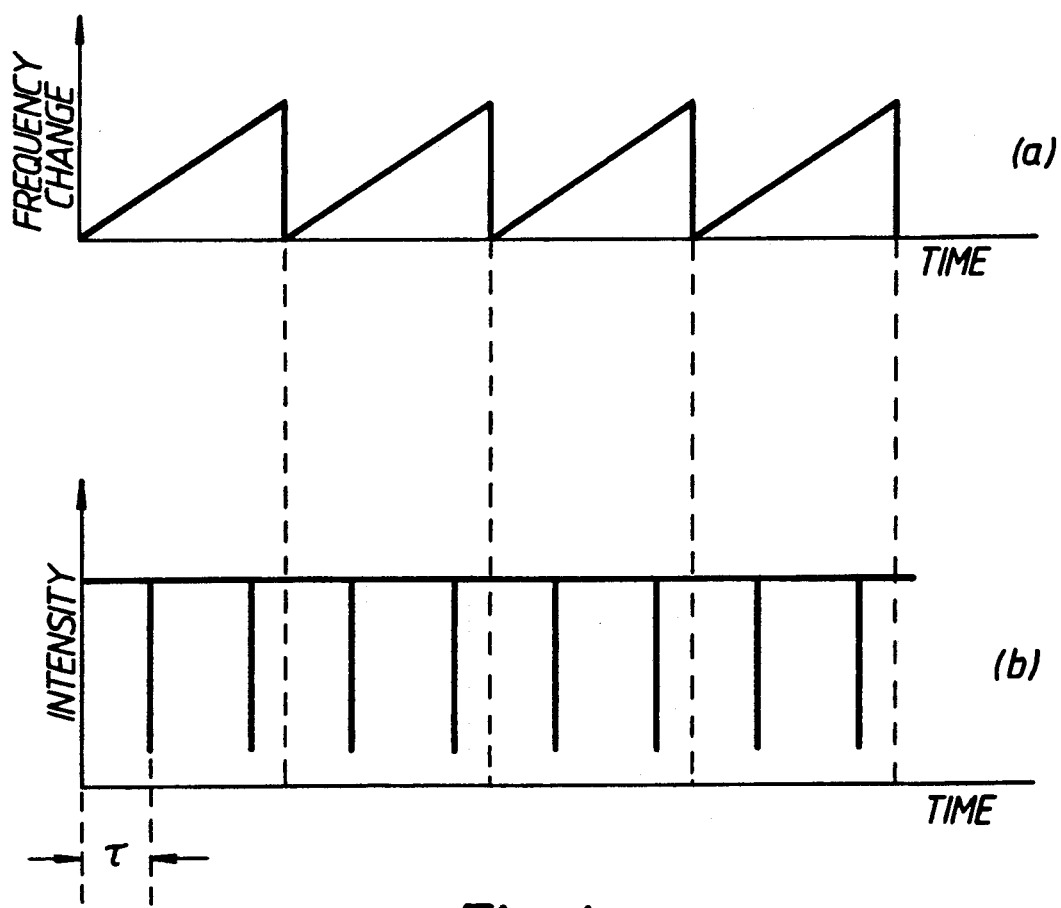
Figure 5:
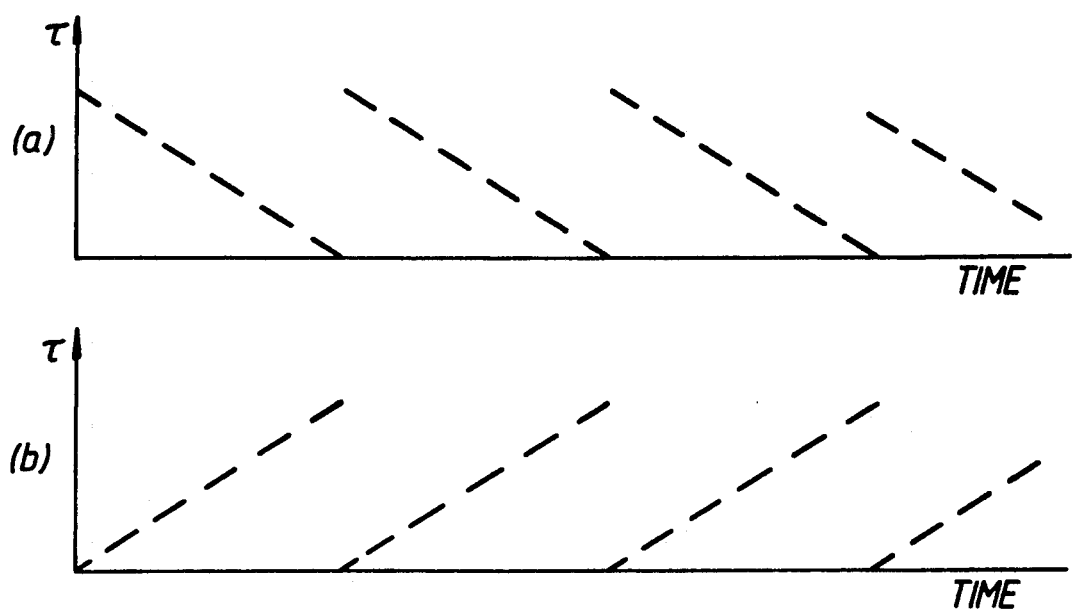
Figure 6:
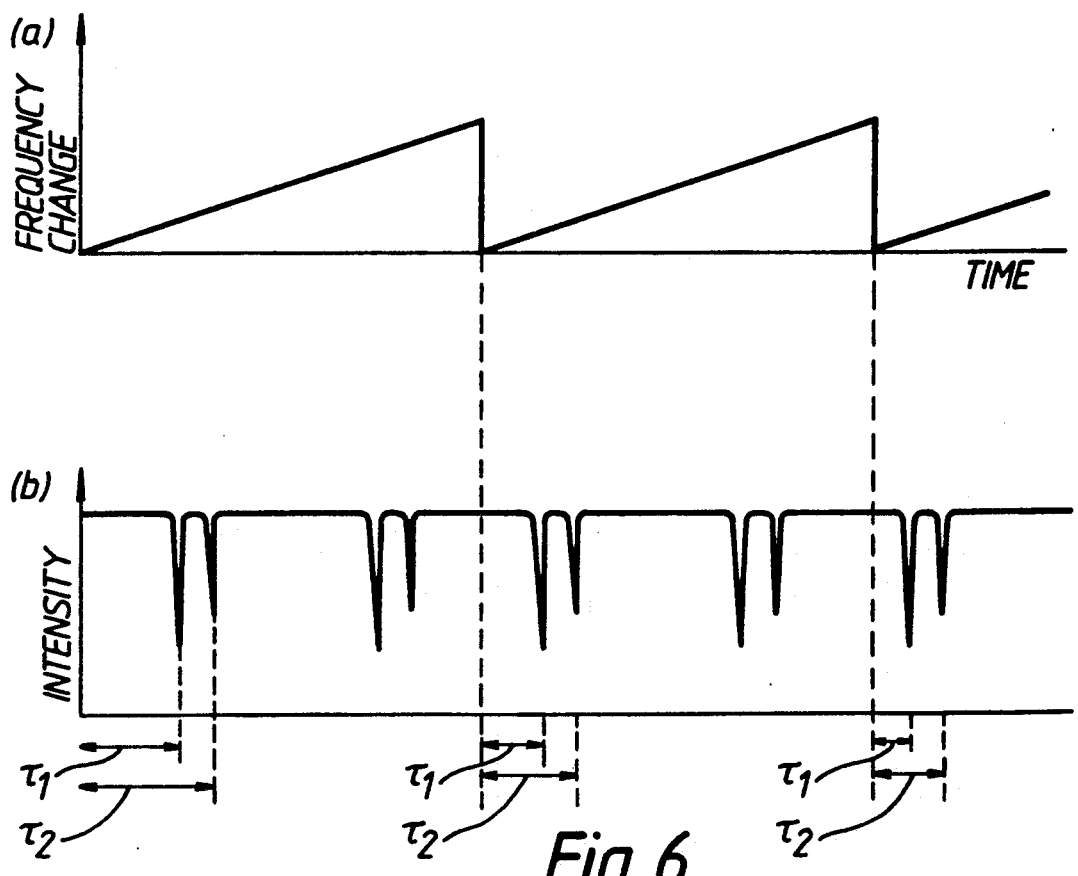
Figure 7:
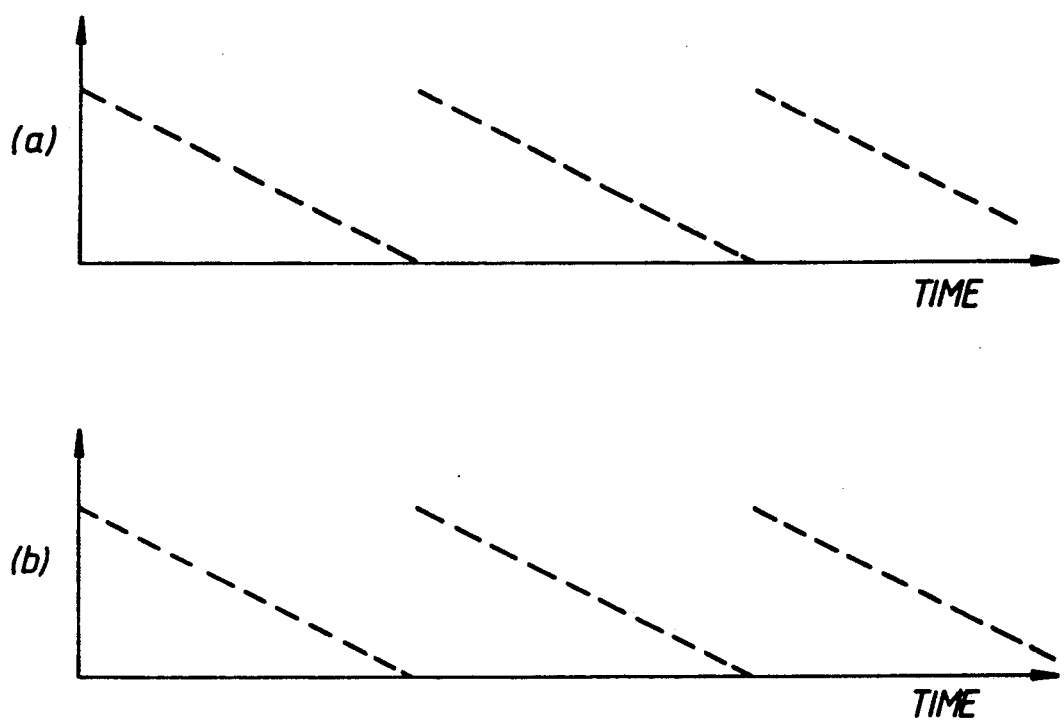
Figure 8:
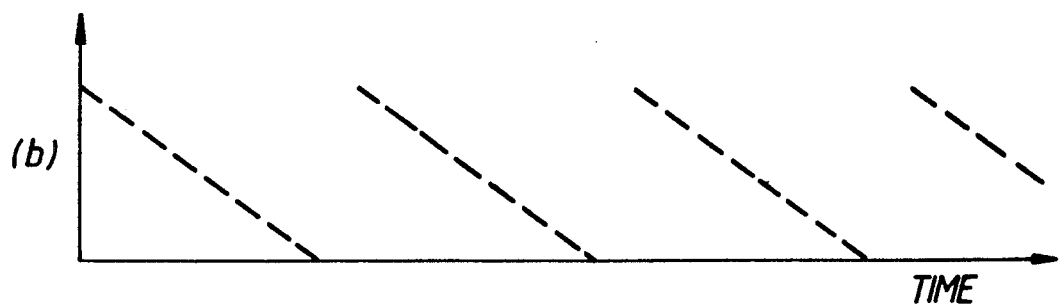
Figure 9:
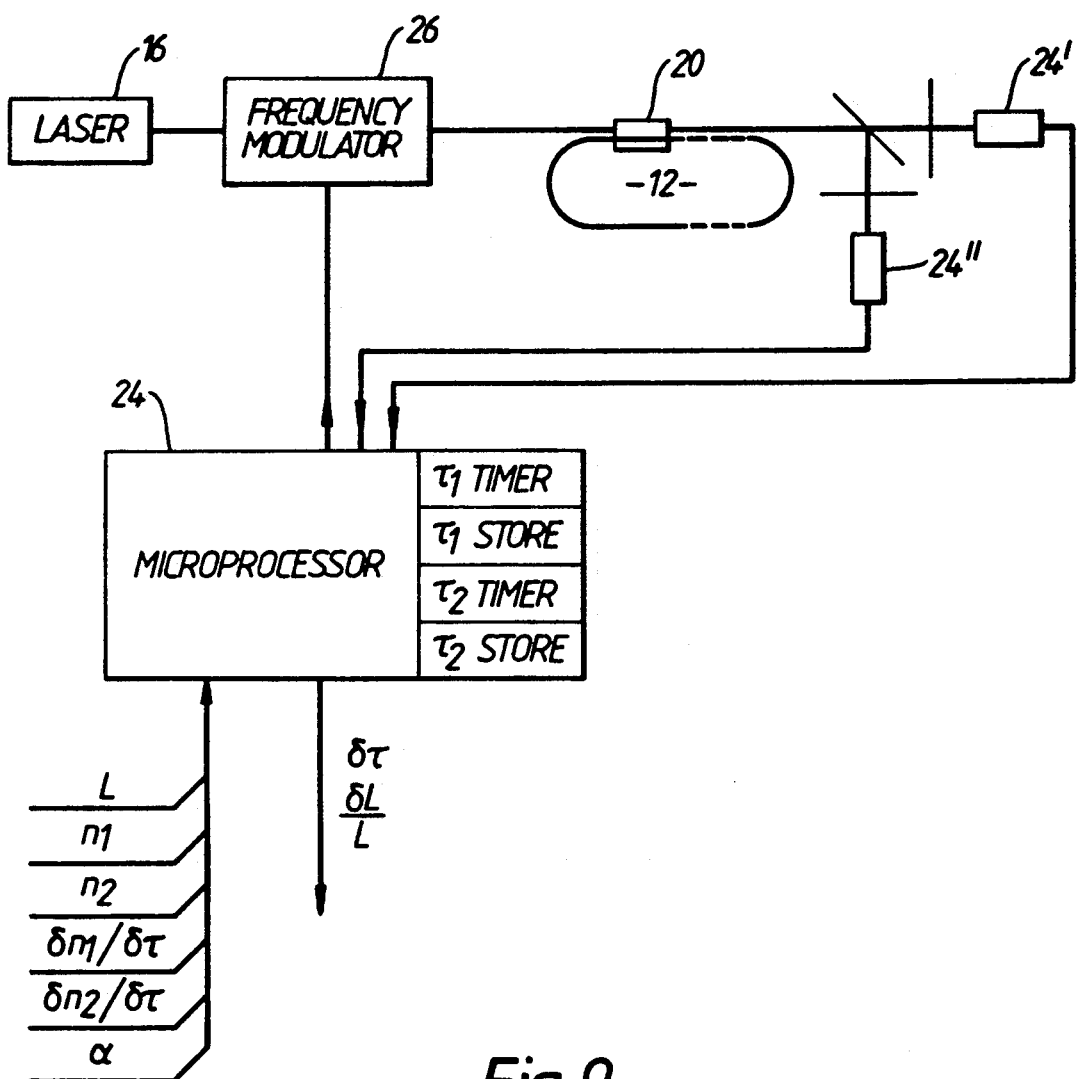

FIG. 4($a$) and ($b$) are graphs illustrating a method of measuring changes in the length of the optical path of a fibre optic resonator;

FIGS. 5($a$) and 5($b$) show typical variations of $\tau$ with time as the resonator is subjected to extension and contraction respectively;

FIGS. 6($a$) and 6($b$) are graphs illustrating a method of measuring changes in the optical lengths of two optical paths defined in a resonator formed of birefringent fibre;

FIGS. 7($a$) and 7($b$) are diagrams representing the variations of $\tau$ for the first and second optical paths respectively as a resonator formed of birefringent optical fibre is subjected to increasing extension;

FIGS. 8($a$) and ($b$) are diagrams representing the variations of $\tau$ for the first and second optical paths respectively as a resonator formed of birefringent optical fibre is subjected to an increasing temperature;

FIG. 9 is a block diagram illustrating the operation of the sensor.

Figure 1:
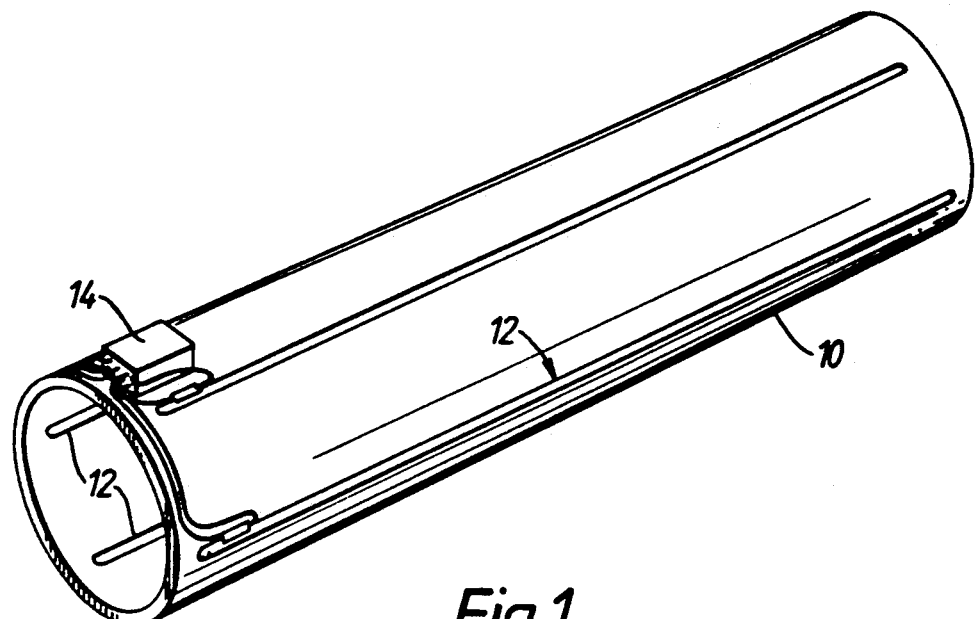
FIG. 1 is a schematic diagram of a structure incorporating four exemplary sensors of this invention.

The composite hollow cylindrical structure 10 illustrated in FIG. 1 is formed of carbon fibre composite material and incorporates four fibre optic strain sensors each having resonator loops 12 which are embedded in the surface of the structure. The sensors provide data representing the longitudinal strain of the structure along axes equispaced 90° around the structure. This arrangement provides many advantages over the use of electrical strain gauges. An average strain is determined over the length of the sensing fibre and this length may be in the range 0.01 to 10 meters depending on the configuration of the sensor. The fibre optic sensor is less likely to be subject to the effects of radiation by ionizing particles which might perturb an electrical strain gauge. The effects of UV radiation and X-ray irradiation on the fibre optic sensor will be substantially attenuated by virtue of being embedded within the composite structure. The fibre optic sensor is expected therefore to offer greater immunity to environmental perturbation than electrical strain gauges as well as offering high accuracy and resolution, with a broad dynamic range and good linearity.

The fibre optical sensor proposed for use in the arrangement of FIG. 1 is a ring resonator using polarization-maintaining highly birefringent fibre which allows temperature compensation of the strain data output by the sensor. It is expected that a single laser will feed several sensors giving a multiplex advantage. As a typical example, in FIG. 1 a single electrical module 14 feeds each of the ring resonators 12 from a single laser source and four photodetectors and associated electronics are contained within the same module 14.

Figure 2:
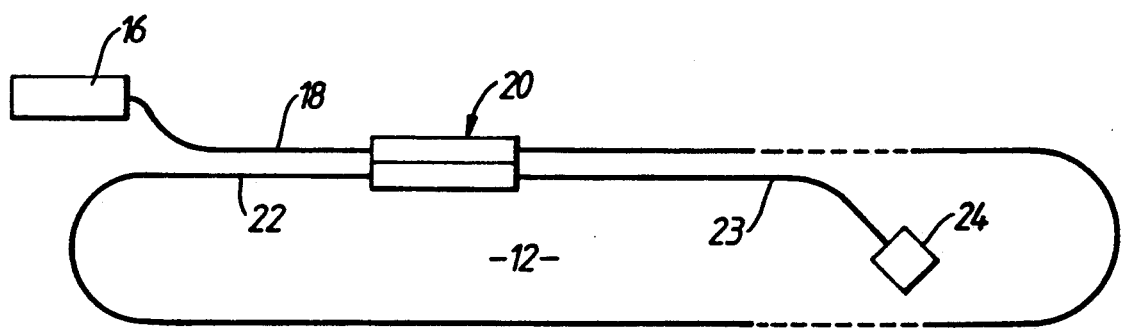
FIG. 2 is a schematic representation of an example of sensor of this invention incorporating a fibre optic resonator.

FIG. 2 shows schematically a single sensor. The sensor comprises a laser source 16, a length of optical fibre 18 supplying light to a coupler 20 and thence into a resonator loop or ring 12 defined by highly birefringent optical fibre 22. Light entering from the coupler 20 passes around the loop 12 to leave via the coupler 20 and pass via a further length of optical fibre 23 to a detector 24.

The optical fibre 22 making up the loop 12 has stress-induced birefringence. For example it may be fibre known as "bow tie fibre" comprising a central optical fibre having twin spaced stress elements provided to either side of the fibre.

As is well known, a birefringent optical fibre has two refractive indices and linearly polarised light aligned with the "fast" axis of the fibre passes through the fibre faster than linearly polarised light aligned with the "slow" axis of the fibre. The fast and slow axes of the fibre are perpendicular and the relative propagation velocities are determined by the respective refractive indices of the fibre.

In the arrangements shown in the Figures, polarised light from the laser source is introduced into the fibre with the plane of polarisation of the incoming radiation at 45° to the fast and slow axes of the highly birefringent fibre so that both polarisations of the fibre are excited with equal amplitude. The light intensity in the fibre is measured by a detector having polarisation filters arranged so that the intensity of both the fast and the slow polarisations can be independently detected. The frequency of the radiation input to the loop and the output representing the intensities of the fast and slow axes are processed as to be described below to determine the change in optical path length along the fast and slow axes and from these the magnitude and direction of any shift in temperature or strain of the fibre.

The birefringent resonator loop is thus functionally similar to two loops of optical fibre of different refractive index arranged to be coincident or adjacent each other. The loop defines two optical paths each having a respective optical path length (O) defined by the physical length (L) of the loop multiplied by the respective refractive index ($n_1$;$n_2$). The optical paths defined in this way are referred to herein as the first and second optical paths.

In general terms, the lengths of the first and second optical paths are measured by applying a predetermined sawtooth frequency change to the source laser to cover a frequency deviation of several free spectral ranges of the resonator, and sensing the resonance dips which occur when the frequency of the source fits the resonance condition of one or other of the first or second optical paths. The time delays ($\tau_1$, $\tau_2$) from the beginning of each sawtooth cycle and the first and second resonance dips indicate the optical path lengths of the first and second optical paths. It will be understood the time delays ($\tau_1$; $\tau_2$) will decrease with an increase in either the physical length (strain) or the refractive index of the resonator loop. In each optical path the frequency of the particular mode resonance monitored will decrease until it is equal to the lowermost frequency of the sawtooth frequency change. Further decrease of the resonant frequency will mean that a mode hop will occur so that the next highest resonant mode will then be monitored and that the interval between the beginning of the sawtooth frequency cycle and the next higher mode will be measured. The delay ($\tau$) is always measured between the beginning of the sawtooth frequency cycle and the first resonance occuring and each mode hop is counted as it occurs so that the correct change in optical length can be calculated.

Having determined the changes ($\delta O_1$, $\delta O_2$) in optical length O of each optical path, the values of temperature change ($\delta T$) and strain ($\delta L/L$) are obtained from the following simultaneous equations:

$$\delta O_1 = L \frac{\partial n_1}{\partial T} \delta T + a n_1 L \frac{\delta L}{L} \qquad (1)$$

$$\delta O_2 = L \frac{\partial n_2}{\partial T} \delta T + a n_2 L \frac{\delta L}{L} \qquad (2)$$

in which L, $n_1$, $n_2$, $a$, $$\frac{\partial n_1}{\partial T} \text{ and } \frac{\partial n_2}{\partial T}$$

are predetermined by either measurement or empirical testing.

The system allows both the strain and the temperature over the sensing length of the resonator loop to be detected, and the measurement of the strain is not sensitive to changes in temperature of the resonator loop.

Having described the principles of the sensor of FIGS. 1 and 2 in general terms, there now follows a detailed explanation and analysis of the sensors.

As referred to above, one of the key requirements of a fibre optic sensor is the ability to discriminate between effects of temperature and effects of strain. A fibre optic sensor will respond to both so the applicants have designed a sensor in which both parameters are measured with a single sensor to eliminate temperature effects when measuring strain. There may be some applications when both pieces of information are required. A technique to do this is described below.

In an interferometer or a resonator the basic measurand is the optical length of the fibre O, defined by
O=nL
n=refractive index
L=physical length
Under a temperature change there will be a change in optical length O given by $$\delta O = \frac{\partial (nL) \delta T}{\partial T} = \frac{L \partial n \delta T}{\partial T} + \frac{n \partial L \delta T}{\partial T}$$

For silica based fibre the following figures are approximately $$\frac{\partial n}{\partial T} = 10^{-5}/°C.$$

$$\frac{\partial L}{\partial T} = 5 \times 10^{-7}/°C.$$

If however the fibre is rigidly bonded to a base structure that has a substantially higher rigidity than the fibre, then the fibre will be forced to accurately follow the expansion of the underlying structure, so the value of $$\frac{\partial L}{\partial T}$$

will be determined by the material used for the base structure. For example, for carbon fibre composites a typical figure is $$\frac{\partial L}{\partial T} = 2 \times 10^{-6}/°C.$$

It is clear that the temperature dependance of the refractive index is a larger effect than the expansion.

The change in optical length per unit change in stress is given by:

$$\frac{\partial(nL)}{\partial\sigma} = \frac{L\partial n}{\partial\sigma} + \frac{n\partial L}{\partial\sigma}$$

The value of $$\frac{\partial n}{\partial\sigma}$$

depends upon the Poisson ratio of the material of the fibre, and the effect of the Poisson ratio is to change the amount by which the optical length changes per unit change in strain. Under tension the volume of the fibre increases which gives rise to a reduction in the refractive index. Only if the material were completely compressible would the volume remain constant and the refractive index be unchanged. This means that the optical length change is less than $n\delta L$ and may be represented by $an\delta L$ where $a \sim 0.83$ (depending on the fibre material properties). $a$ can be determined empirically for a particular optical fibre or sensor.

Under the combined influence of a temperature change and a length change, the change in optical length may be given by:

$$\delta O = \left(L\frac{\partial n}{\partial T} + n\left(\frac{\partial L}{\partial T}\right)_s\right)\delta T + anL\frac{\delta L}{L}$$

Where $$\left(\frac{\partial L}{\partial T}\right)_s$$

is the expansion coefficient of the underlying structure. In order to resolve effects of $\delta T$ from $\delta L$ two measurements for each sensor needs to be made. This is achieved by the use of the fast and slow axes of polarization-maintaining highly birefringent fibre. Such a fibre defines two optical paths, a first optical path through a medium having refractive index $n_1$, and a second optical path through a medium having a refractive index $n_2$. The changes in optical paths lengths ($\delta O_1$; $\delta O_2$) due to changes in temperature and/or strain are given by the expressions:

$$\delta O_1 = \left(L\frac{\partial n_1}{\partial T} + n_1\left(\frac{\partial L}{\partial T}\right)_s\right)\delta T + an_1L\frac{\delta L}{L} \quad (1)$$

$$\delta O_2 = \left(L\frac{\partial n_2}{\partial T} + n_2\left(\frac{\partial L}{\partial T}\right)_s\right)\delta T + an_2L\frac{\delta L}{L} \quad (2)$$

The difference ($n_1 - n_2$) depends upon the beat length of the fibre, and for a typical beat length of 1 mm ($n_1 - n_2$) = $4 \times 10^{-3}$ and $n_1$ is approximately 1.47. Also typical figures for silica fibre gives $$\frac{\partial n_1}{\partial T} - \frac{\partial n_2}{\partial T} = 10^{-6}/°C.$$

The effect of a change in the underlying structure temperature is the same as a length change, so expressions (1) and (2) above may be abbreviated to:

$$\delta O_1 = L\frac{\partial n_1}{\partial T}\delta T + an_1L\frac{\delta L}{L} \quad (3)$$

$$\delta O_2 = L\frac{\partial n_2}{\partial T}\delta T + an_2L\frac{\delta L}{L} \quad (4)$$

In the basic sensor shown in FIGS. 1 and 2, light is emitted from a laser and coupled to a resonator loop defined by a loop of high birefringent fibre. The light from the laser is frequency stabilised to ensure a narrow line width (the value depending on the particular application) and a good long term frequency stability. The intensity coming out of the resonator loop has a response given by:

$$I(\delta) = 1 - \frac{k}{1 + F\sin^2 \delta/2}$$

where
F = finesse of the resonator $$\delta = \frac{2\pi}{\lambda}(\nu - \nu_0)nL$$

Figure 3:
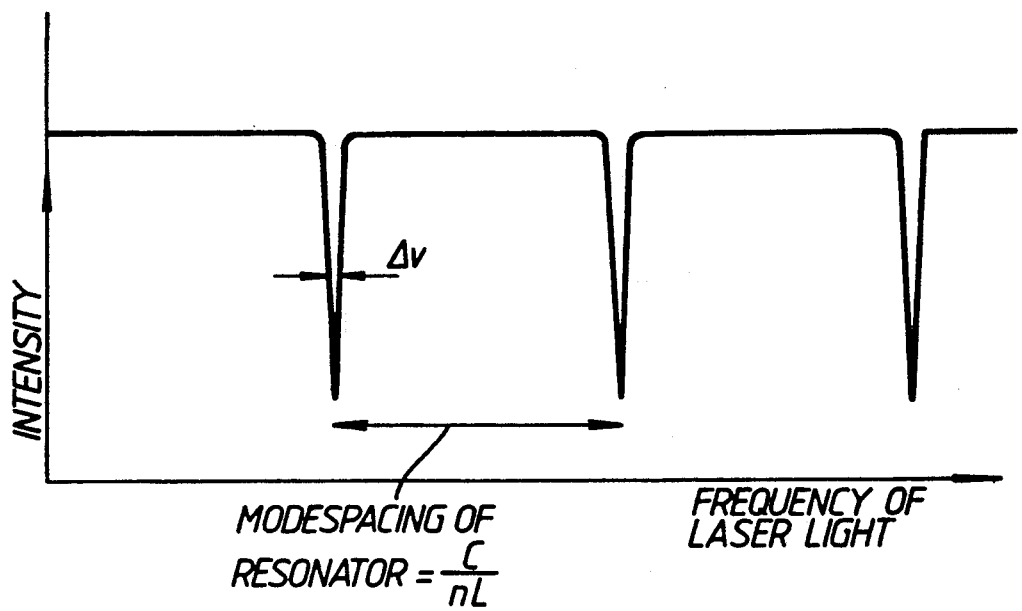
FIG. 3 is a graph illustrating the intensity response of a fibre optic resonator having a single optical path.

L = fibre loop length
$\lambda$ = wavelength of light
n = refractive index of the fibre (effective index of the mode)
($\nu - \nu 0$) = frequency shift with respect to resonance.
$k \leq 1$, a constant depending on the loss of the resonator The intensity response for a single optical path if the frequency of the source laser light is varied is shown in FIG. 3. The spacing between adjacent resonance dips, or the mode spacing (S) of the resonator is given by:

$$S = \frac{c}{nL}$$

where c is the speed of light. For a typical loop length of 1 meter of fibre S = 204 MHz. The finesse F is defined by:

$$F = \frac{S}{\Delta\nu}$$

where $\Delta\nu$ is the full half width of the resonance (see FIG. 3). For a high quality resonator F is typically greater than 100, so a value of 100 is used in the calculations for a typical example below.

In FIG. 3 the intensity response as a function of laser frequency is shown. The same graph is obtained if the optical path length (O) of the resonator is varied. In this case a mode spacing occurs when the optical path length changes by $\lambda$, the wavelength of light. For a finesse of 100 it should be possible to determine the path length to $\lambda/100$ resolution, or better.

Referring now to FIGS. 4(a) and (b) the method of measurement will now be described with respect to a single optical path. A sawtooth frequency change is applied to the source laser to cover a frequency deviation of several free spectral ranges of the resonator and the intensity response of the resonator is monitored to determine where the first resonance in the band swept occurs. The frequency modulation may be achieved in many ways, the following being several examples. For a gas laser source a piezo-actuator can be used to sweep the frequency or, for a semiconductor laser, the injection current can be altered. A third alternative is to use an integrated optic frequency shifter but this may have a limited frequency sweep (typically 100 MHz) which may not be broad enough to cover several free spectral ranges of the resonator depending on the length of the resonator.

A typical sweep repeat time might be 0.1-1. Oms. After a time $\tau$ from the beginning of the sawtooth cycle the resonance dip occurs when the frequency of the source fits the resonance condition of the resonator.

$$nL = m\lambda = \frac{mc}{v(t)}$$

where
m is an integer, the order number
$\lambda$ = wavelength of light
$v(t)$ = frequency of the light
c = speed of light in vacuo
n = refractive index of the fibre It is possible to map changes in $\tau$ using a timer so that length changes L can be determined with an accuracy of better than $\lambda/100$. FIG. 4(b) shows the variation of intensity over three successive sawtooth cycles during which the optical length of the path remains substantially constant. It will be noted that the frequencies swept include two resonant modes and that the time delay $\tau$ is measured from the start of the sawtooth cycle to the first resonant mode.

FIGS. 5(a) and 5(b) show how the value of $\tau$ changes under a uniform extension or contraction respectively. A value of $\tau$ is obtained for each sawtooth cycle, so that under an extension the frequencies of the resonant modes decreases and the value of $\tau$ decreases until another mode appears, at which time the value of $\tau$ suffers a sudden increase with a jump corresponding to the mode spacing. Similarly under a contraction the value of $\tau$ increases until a mode jump occurs. In this way the sign of the motion may be determined by the sense of the variation of $\tau$ with time.

In these examples, the period of the sawtooth is significantly shorter than the time taken for the optical path to increase or decrease by an amount greater than the wavelength of light. This is set by a consideration of the loop length of the resonator, the period of the sawtooth time and the expected environment.

The above technique is used to determine in parallel the lengths of each of the optical paths defined in a highly birefringent fibre as to be described with reference to FIGS. 5(a) and (b). The radiation from the laser source is input so that the incident polarisation is at 45° to the fast and slow axes of the highly birefringent fibre so that both polarisations are excited with an equal amplitude. In this case for each mode spacing two resonances are observed, one corresponding to the fast axis and the other to the slow axis of polarisation. FIG. 6(a) shows the source frequency change and FIG. 6(b) shows the typical response, and two values $\tau_1$ and $\tau_2$ are determined. In this way values of $\delta O_1$ and $\delta O_2$ may be determined as function of time from a single sensor using the expressions (3) and (4):

$$\delta O_1 = L \frac{\partial n_1}{\partial T} \delta T + a n_1 L \frac{\delta L}{L}$$

-continued $$\delta O_1 = L \frac{\partial n_2}{\partial T} \delta T + a n_2 L \frac{\delta L}{L}$$

Under a temperature change there will be a different value of $\delta O_1$ and $\delta O_2$ for the polarisations of the two optical paths which will differ by about 5% for a bow tie fibre. However, under a uniform extension $\delta O_1$ and $\delta O_2$ will change at substantially the same rates. It has been noted that a path length change of 50 μm is required to induce a phase change of $2\pi$ for a fibre with a beat length of 1 mm at a wavelength of 633 nm. This will cause the relative positions of the two polarisations to change by one order. A phase of $2\pi$ is caused by an extension of 0.43 μm ($\lambda/n$), so typically the difference in path length changes between the two modes is 1% of the path length change of a single mode.

In this way it will be possible to determine the temperature change ($\delta T$) and the strain ($\delta L/L$) and to discriminate between the temperature change and the strain. FIGS. 7 and 8 show an example. Because there are two measurements ($\tau_1$ and $\tau_2$ giving $\delta O_1$ and $\delta O_2$) $\delta T$ and $\delta L$ can be separately determined given the values of the constants in the equations. The temperature coefficients are determined by calibration of the sensors in a laboratory, and the length coefficients are determined knowing the constant $a$, and determining the optical length $n_1 L$ and $n_2 L$ from the free spectral range of the resonators.

Referring to FIG. 9, two detectors (24', 24") with associated polarising filters detect the intensity of the light in the first and second optical paths in the resonator loop 12 and supply their outputs to a high speed microprocessor 24. The light from the laser source 16 passes via a frequency modulator 26 into the resonator loop 12. The frequency modulator is controlled by the processor 24. The processor includes two timers and respective stores which, in each sawtooth period, measure the delay between the beginning of the period and the resonant mode for the first and second optical paths respectively. The stores are incremented or decremented as appropriate each time a mode hop occurs. The data provided by each timer and store thus represents the optical length for the particular optical path in terms of mode number and delay $\tau$. Since the sensor is measuring relative changes only it is not necessary to know the absolute mode number but only changes thereof relative to a datum.

The processing of the data ($\tau_1(\tau)$ and $\tau_2(\tau)$) will be done by the high speed microprocessor which will determine the occurrence of the mode hops and determine $\delta L$ and $\delta T$ knowing the scale factors of the sensors from prior calibration as discussed above.

In a typical example for measuring a strain sensitivity of $10^{-6}$ a distributed feedback laser diode source (temperature stabilized) can be used with a linewidth of a 10 MHz, for a resonator of loop length of 20 cm with a finesse of 100. Small frequency shifts of the laser source do not affect the temperature compensation of the sensor as this compensation is due to the difference between the fast and slow axes of the highly birefringent fibre, and the source frequency drift affects both in the same way, so it interpreted as a length change. A strain sensitivity of $1.10^{-6}$ would allow a source wavelength variation of 470 MHz, at a wavelength of 633 nm.

To achieve a strain sensitivity of $10^{-8}$ a frequency stabilised laser source of 2-4 MHz stability is required (depending on the source wavelength). This can be achieved by a Zeeman effect stabilised helium neon laser operating at 0.633 μm, 1.15 μm or 1.52 μm wavelength, the wavelength chosen by the application.

The difference between gradients of the change in optical path length with time for the first and second optical paths as illustrated in FIGS. 7(a) and (b) is much less than that in FIGS. 8(a) and (b). This makes it possible to distinguish between a change in optical path length brought about by a change in temperature and one brought about by a change in strain. The examples of the invention allow the temperature and strain to be determined independently along the sensing length of the resonator loop. Whilst the examples are described with particular reference to an arrangement on which the resonators are embedded in a composite structure it will be appreciated that the sensors may be modified for use on the surface of an object. Similarly, although in the illustrated example two optical paths of different refractive index are defined by a single highly birefringent fibre it would be possible to provide an arrangement in which the two optical paths were defined by other means.

I claim:

1. A sensor for determining changes in at least one of a physical dimension and the temperature of an object, said sensor comprising:
   means defining a first optical path having a first refractive index;
   means defining a second optical path having a second refractive index different from said first refractive index, said second path being adjacent or substantially coincident with said first path;
   means for introducing light into each of said paths;
   frequency modulation means for applying a repeating ramp frequency modulation to the light introduced into each of said paths;
   detector means for detecting resonances of the light in said first path and said second path; and
   processing means responsive to a timing of the appearance of said resonances to output data representative of at least one of said physical dimension and temperature based thereon.

2. A sensor according to claim 1, which includes a bire-fringent optical fibre defining said first and said second optical paths which are respectively fast and slow axes of the bire-fringent optical fibre.

3. A sensor according to claim 1, wherein said first optical path and said second optical path each form part of a respective first and second fibre optic resonator.

4. A sensor according to claim 1, wherein said first optical path and second optical path form parts of a respective first and second fibre optic interferometer.

5. A sensor according to claim 3, wherein said processing means includes means for deducing changes in the first and second optical path lengths and means for deriving data representative of changes in the physical dimension or the temperature according to the following relationship:

$$\delta O_1 = K_1 \frac{\delta T}{T} + K_2 \frac{\delta L}{L}$$

$$\delta O_2 = K_3 \frac{\delta T}{T} + K_4 \frac{\delta L}{L}$$

wherein $\delta O_1$, $\delta O_2$ are the sensed changes in the first and second optical path lengths respectively;
$\delta T$ is the change in temperature;
$\delta L$ is the change in physical dimension, and
$K_1$ to $K_4$ are predetermined constants.

6. A sensor according to claim 5 wherein the frequency modulation means includes means for applying a sawtooth frequency change.

7. A sensor according to claim 6, wherein said resonance detector means comprises means for measuring a delay between a beginning of each cycle of the sawtooth frequency change and an occurrence of respective resonances in the first and second optical paths.

8. A sensor according to claim 7 further comprising means responsive to a change in the mode of vibrations in said first and second paths to count and store said mode changes.

9. A method of determining changes in at least one of a physical dimension and a temperature of an object, said method comprising the steps of:
   passing light along a second optical path having a first refractive index;
   passing light along a second optical path having a second refractive index different from said first refractive index, said first and second paths being adjacent or substantially coincident;
   obtaining data representative of changes in optical path lengths of each of said first and second optical paths caused by a change in at least one of said physical dimension and temperature;
   applying a repeating ramp frequency modulation to the light passed into said first and second optical paths; and
   timing an appearance of resonances in said first and second optical paths thereby to obtain data representative of changes in at least one of the physical dimensions and temperature.

10. A structure incorporating a sensor for determining changes in at least one of a physical dimension and a temperature of an object, said sensor comprising:
    means defining a first optical path having a first refractive index;
    means defining a second optical path having a second refractive index different from said first refractive index, said second path being adjacent or substantially coincident with said first path;
    means for introducing light into each of said paths;
    frequency modulation means for applying a repeating ramp frequency modulation to the light introduced into each of said paths;
    detector means for detecting resonances of the light in said first path and said second path; and
    processing means responsive to the timings of the appearance of said resonances to output data representative of at least one of said physical dimension and temperature.

11. A structure according to claim 10, wherein at least a major portion of said means defining the first and second optical paths is embedded in the structure.

12. A structure according to claim 10 or 11, which further includes actuator means responsive to the output of said sensor to compensate the structure for changes in length.

13. A structure according to claim 11, which further includes actuator means responsive to the output of said sensor to compensate the structure for changes in length.

* * * * *